Sept. 22, 1925.
C. W. EGGENWEILER
1,554,493
METHOD OF MAKING BEARINGS AND THE LIKE
Filed Oct. 6, 1924
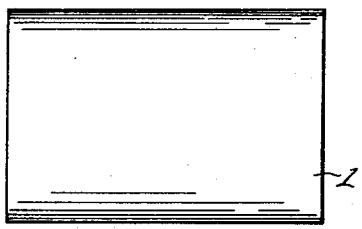
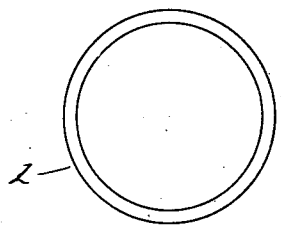
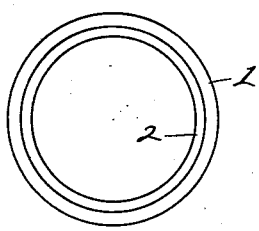
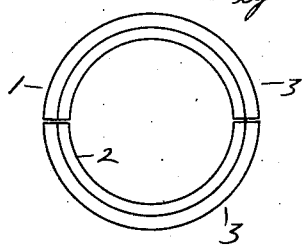
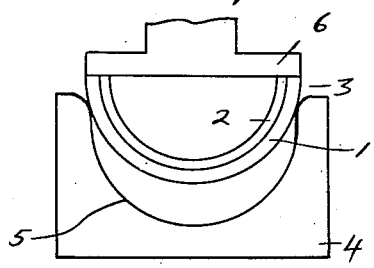
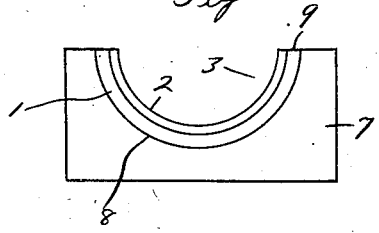
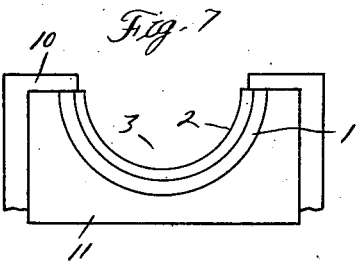
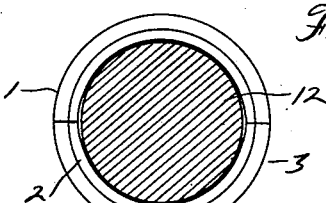
Inventor
Charles W. Eggenweiler Patented Sept. 22, 1925.

1,554,493

UNITED STATES PATENT OFFICE.

CHARLES W. EGGENWEILER, OF DETROIT, MICHIGAN, ASSIGNOR, BY MESNE ASSIGNMENTS, TO BOHN ALUMINUM AND BRASS CORPORATION, A CORPORATION OF MICHIGAN.

METHOD OF MAKING BEARINGS AND THE LIKE.

Application filed October 6, 1924. Serial No. 741,997.

*To all whom it may concern:*

Be it known that I, CHARLES W. EGGENWEILER, a citizen of the United States of America, residing at Detroit, in the county of Wayne and State of Michigan, have invented certain new and useful Improvements in Methods of Making Bearings and the like, of which the following is a specification, reference being had therein to the accompanying drawings.

The invention relates to bearings and the like and refers more particularly to the method of forming the same. One of the objects of the invention is the manufacture of a bearing formed of interchangeable parts. Another object is the manufacture of the parts of the bearing in such a way that they will be accurate.

Further objects reside in the novel features as more fully hereinafter set forth.

In the drawings:

Figure 1 is a side elevation of a bearing shell blank;

Figure 2 is an end elevation thereof;

Figure 3 is an end elevation of the bearing blank;

Figure 4 is an end elevation of the bearing blank severed diametrically;

Figure 5 is an end elevation of a segmental bearing blank having its radius reduced;

Figure 6 is an end elevation of a segmental bearing blank with its side edges finished;

Figure 7 is an end elevation of a segmental bearing blank with its inner face finished;

Figure 8 is an end elevation of a completed bearing.

1 is the oversized cylindrical shell blank of a bearing having its inner and outer surfaces of greater radii than the corresponding radii of the final article, or the article assembled for actual use. This shell blank as shown in Figures 1 and 2, has been rough bored and tinned and finally rough turned on its outer surface as well as rough faced on its ends.

The shell blank is next provided with the Babbitt lining 2 which is bored out to provide an oversized cylindrical hole having a radius greater than the corresponding radius of the final article. Then the outer surface of the shell blank 1 is part turned and its ends are part faced and finally its outer surface is ground to a finished radius, leaving the thickness of the wall slightly greater than that of the final article. Figure 3 shows a bearing blank formed by the preceding steps of the operation.

The bearing blank, as thus far described, is then diametrically severed, as shown in Figure 4, by suitable means such as a saw.

Each segmental blank 3 formed by diametrically severing the bearing blank 1 is then pressed to reduce its radius to less than that of the final article by an amount such that the segmental blank will spring back to a slightly greater radius than that of the final article. As shown in Figure 5, each segmental blank 3 is pressed into the die 4 having the semi-cylindrical face 5, which has a radius slightly less than the radius of the outer surface of the final article. 6 is the ram of a press engageable with the side edges of the segmental blank for forcing the latter into the die and thereby reducing its radius. When the segmental blank has been removed from the die it springs back again so that its radii will be slightly greater than the corresponding radii of the final article.

Each segmental blank is then pressed into a special fixture such as the die 7, shown in Figure 6 having the semi-cylindrical face 8 with the same radius as the radius of the outer surface of the final article. While the segmental blank is held in this die its side edges 9 are finished by a suitable broaching operation to produce a true semi-cylindrical segmental article.

Upon removal from the die 7, two of these segmental blanks, which have sprung outwardly to a slight extent, are then placed upon an arbor and compelled to assume the arc of the final article, after which such operations as facing their ends and chamfering the ends of their inner surfaces are carried out. The segmental blanks are then operated upon to provide the necesary dowel holes, oiling grooves and passageways and to remove any burring after which the inner surface of the Babbitt lining 2 is finished by a suitable broaching operation while each segmental blank is accurately held to the arc of the final article as by means of the clamps 10 holding the segmental blank in the die 11. The inner surface of each segmental blank is finished to the corresponding radius of the final article and then relieved slightly adjacent to the side edges, after which the segmental blank is removed, at which time it, with a complementary segmental member, will occupy a position such as shown in Figure 8, in which it will be noted that the radii of the inner and outer surfaces of the segmental blanks are slightly greater than the corresponding radii of the final article when it is in use and clamped upon the pin or rod 12 at which latter time the surfaces of the segmental blanks are concentric with the pin or rod, and the inner surfaces are spaced from the pin or rod a distance sufficient to provide for an oil film.

What I claim as my invention is:

1. In the method of making bearings and the like, the forming of an oversized cylindrical blank having a wall of greater thickness than the wall of the final article, the diametrical severing of the blank to produce two segmental members and the finishing of the wall of each segmental member while having the same arc as the final article to produce the desired thickness of the wall of the final article.

2. In the method of making bearings and the like, the forming of an oversized cylindrical blank, the diametrical severing of the blank to produce two segmental members and the finishing of the side edges of each segmental member while having the same arc as the final article to form a true semi-cylindrical member.

3. In the method of making bearings and the like, the forming of an oversized cylindrical blank having a wall of greater thickness than the wall of the final article, the diametrical severing of the blank to produce two segmental members, the pressing of each segmental member to reduce its size so that it will be slightly greater than that of the final article and the finishing of the wall of each segmental member while having the same arc as the final article to prduce the desired thickness of the wall of the final article.

4. In the method of making bearings and the like, the forming of an oversized segmental blank, the diametrical severing of the blank to produce two segmental members, the pressing of each segmental member to reduce its size so that it will be slightly greater than that of the final article and the finishing of the side edges of each segmental member while having the same arc as the final article to form true semi-cylindrical members.

5. In the method of making bearings and the like, the forming of an oversized cylindrical blank having a wall of greater thickness than that of the wall of the final article, the diametrical severing of the blank to produce two segmental members, the pressing of each segmental member to reduce its radius to less than that of the completed article by an amount such that the segmental member will spring back to a slightly greater radius than that of the final article and the finishing of the wall of each segmental member while having the same arc as the final article to produce the desired thickness of the wall of the final article.

6. In the method of making bearings and the like, the forming of a cylindrical blank having its wall of greater thickness than the final article and having its inner and outer faces of greater radii than the corresponding radii of the final article, the diametrical severing of the cylindrical blank to form two segmental members, the pressing of each segmental member to reduce its radii so that one of its radii will be slightly greater than the corresponding radius of the final article, the finishing of the side edges of each segmental member while one of the radii of the same is equal to the corresponding radius of the final article, whereby each segmental member will be a true semi-cylindrical member, and the finishing of the wall of each segmental member to reduce its thickness to that of the final article.

7. In the method of making bearings and the like, the forming of a cylindrical blank having its wall of greater thickness than the final article and having its inner and outer faces of greater radii than the corresponding radii of the final article, the diametrical severing of the segmental blank to form two segmental members, the pressing of each segmental member to reduce its radii to less than the corresponding radii of the final article by an amount such that the segmental member will spring back so that its radii will be slightly greater than the corresponding radii of the final article, the finishing of the side edges of each segmental member while the radius of the outer face of the segmental member is equal to the corresponding radius of the final article, whereby each segmental member will be a true semi-cylindrical member and the finishing of the inner face of each segmental member while the outer face thereof has a radius equal to the corresponding radius of the final article to form this inner face with a radius equal to the corresponding radius of the final article.

8. In the method of making bearings and the like, the clamping of a segmental blank in a die having a semi-cylindrical face with the same radius as that of the outer surface of the final article, and the finishing of the side edges of each segmental blank while clamped in place.

9. In the method of making bearings and the like, the forming of a segmental blank having a wall of greater thickness than the thickness of the final article, the finishing of the side edges of the segmental blank while the radius of its outer face is equal to the corresponding radius of the final article whereby each segmental blank will be a true semi-cylindrical member, and the finishing of the inner face of each segmental blank while its outer face has a radius equal to the corresponding radius of the final article to form this inner face with a radius equal to the corresponding radius of the final article.

10. In the method of making bearings and the like, the steps including, the forming of an oversized cylindrical blank having a wall of greater thickness than that finally required, babbitting the blank, rough-boring the babbitt, finish grinding the outside of the blank, diametrically serving the blank to produce two segmental members, pressing each segmental member to reduce the same to approximate size, finishing the parting line, drilling and grooving the segmental member and removing burrs therefrom, and finally subjecting the segmental member to a broaching operation.

11. In the method of making bearings and the like the steps including, the forming of an oversized cylindrical blank having a wall of greater thickness than that of the wall of the final article, rough-turning the blank, babbitting the blank, rough-boring the babbitt, finish grinding the blank on its outer surface, diametrically severing the blank to produce two segmental members, closing in the segmental member to reduce the same to approximate size, finishing the parting line, drilling and grooving the segmental member, removing burring therefrom, and finally subjecting the member to a broaching operation.

In testimony whereof I affix my signature.

CHARLES W. EGGENWEILER.